United States Patent [19]

Sasagawa et al.

[11] 4,392,400
[45] Jul. 12, 1983

[54] TRIMMING AND PIERCING APPARATUS

[75] Inventors: Masaru Sasagawa, Sayama; Tatsuo Umeda, Tokorozawa; Mamoru Kushima, Kawagoe, all of Japan

[73] Assignee: Honda Giken Kogyo Kabushiki Kaisha, Tokyo, Japan

[21] Appl. No.: 284,110

[22] Filed: Jul. 16, 1981

[30] Foreign Application Priority Data

Feb. 25, 1980 [JP] Japan .................................. 55-23236

[51] Int. Cl.³ .............................................. B26F 1/40
[52] U.S. Cl. ........................................ 83/185; 83/192; 83/382; 83/518; 83/519
[58] Field of Search ................. 83/382, 456, 515, 519, 83/620, 622, 623, 518, 185, 188, 192, 682, 914

[56] References Cited

U.S. PATENT DOCUMENTS 1,638,526 8/1927 Christie ................................... 83/519
3,461,756 8/1969 Mojonnier ........................ 83/914 X Primary Examiner—James M. Meister Attorney, Agent, or Firm—Armstrong, Nikaido, Marmelstein & Kubovcik

[57] ABSTRACT

A trimming and piercing apparatus of an extremely high operation efficiency which is capable of trimming and piercing a work simultaneously. The apparatus comprises a fixed die provided with a work mounting surface and a piercing bore opened at the work mounting surface, and a movable die displaceable toward and away from the fixed die. A pair of movable blades and a pair of fixed blades are provided in a spaced opposed relation on the movable die and the fixed die, respectively, so that the movable blades are engageable with said fixed blades when the movable die is moved toward the fixed die. A cam slide having a piercing punch is slidably mounted on the movable die. A cam driver is mounted on the fixed die for driving the cam slide to move along the movable die toward the fixed die to place the piercing punch into fitting engagement with the piercing bore in the fixed die as the movable die is displaced toward the fixed die.

7 Claims, 3 Drawing Figures

TRIMMING AND PIERCING APPARATUS

BACKGROUND OF THE INVENTION

1. Field of the Invention

This invention relates to a trimming and piercing apparatus for use in trimming lower edge portions and piercing an upper portion of a work which has been subjected to a bending step.

2. Description of the Prior Art

When a work is subjected to trimming and piercing steps, special apparatuses designed to meet the respective purposes have heretofore been used. This necessarily causes an increase in the cost of equipment. Moreover, these apparatuses occupy a comparatively large space in a workshop, so that the rate of effective use of working environment is decreased. These apparatuses are used to obtain products by subjecting works to two steps i.e. trimming and piercing steps. Accordingly, it is necessary that each work be positioned, processed and removed from the apparatus in each step. In addition, the work removed from the apparatus after a first step has been carried out has to be transferred to a position in which the work is to be subjected to a second step. This requires much labor and time, and results in a decrease in the operation efficiency.

SUMMARY OF THE INVENTION

An object of the present invention is to eliminate the above-mentioned drawbacks encountered in a conventional method of subjecting works to trimming and piercing steps.

Another object of the present invention is to provide a trimming and piercing apparatus of a simple construction which permits trimming and piercing a work in one step and improving the operation efficiency to a great extent.

To these ends, the present invention provides a trimming and piercing apparatus comprising a fixed die provided with a work mounting surface and a piercing bore opened in the work mounting surface, another die disposed movably with respect to the fixed die, a pair of movable blades and a pair of fixed blades which are provided in an opposed relationship on the movable die and the fixed die, respectively, and which are engageable with one another when the movable die is moved close to the fixed die, a cam slide slidably provided on the movable die, a piercing punch fixed to the cam slide, and a cam driver which is provided on the fixed die and which is adapted to slidingly move the cam slide on the movable die toward the fixed die as the movable die is moved toward the fixed die, to allow the piercing punch to be fitted into the piercing bore provided in the fixed die.

The above and other objects, features and advantages of the present invention will become apparent from the following description of the preferred embodiment taken in conjunction with the accompanying drawings.

DESCRIPTION OF THE PREFERRED EMBODIMENT

An embodiment of the present invention will be described with reference to the accompanying drawings.

Figure 1:
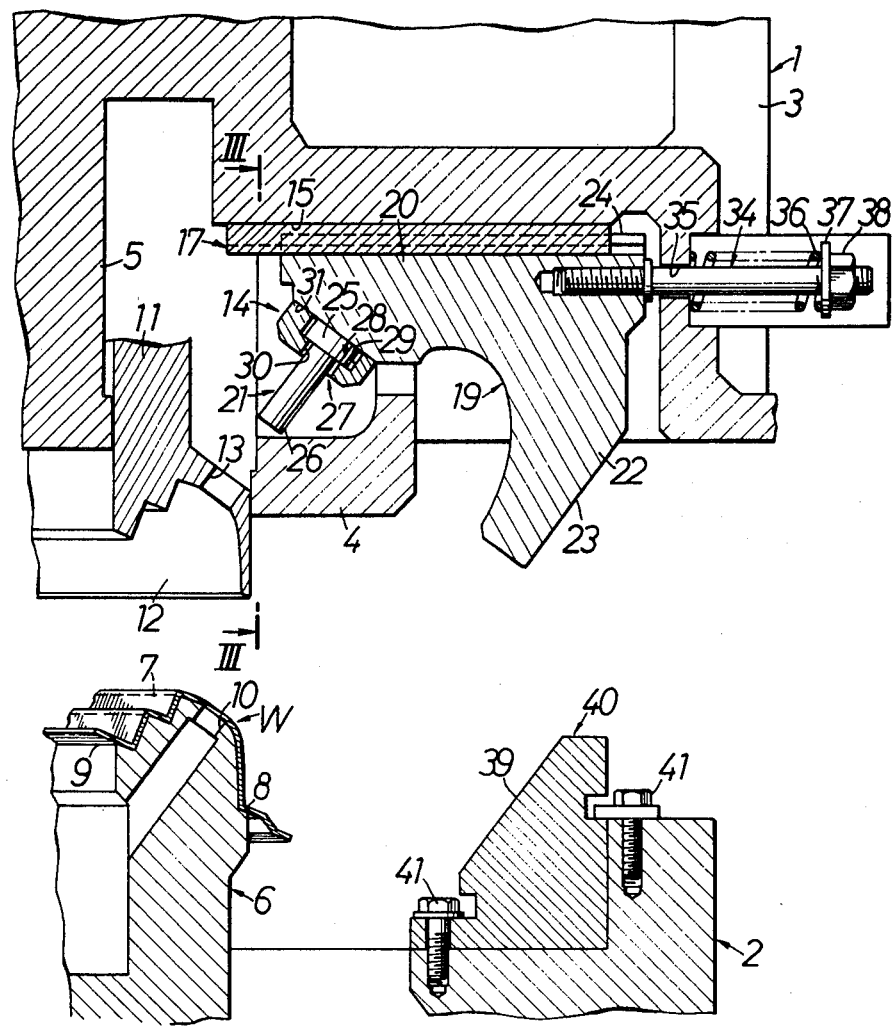
FIG. 1 is a front elevational view in section of a trimming and piercing apparatus according to the present invention, in which trimming and piercing operations are ready to be carried out.

Referring to FIG. 1, reference numeral 1 denotes a vertically movable trimming die fixedly joined to a ram (not shown). The movable die 1 has a base portion 3, and a pair of blades 4, 5 extending in a spaced relationship in the downward direction from the base portion 3. A base 2 is disposed below the movable die 1, and a fixed die 6 for use in trimming and piercing operations is projected from an upper surface of the base 2. The fixed die 6 has a stepped surface 7 formed at its upper end for mounting a work W thereon, a pair of trimming blades 8, 9 projected from inner and outer side surfaces thereof, and a piercing bore 10 opened at an upper surface thereof and having an axis extending obliquely with respect to the direction in which the die 1 is moved up and down. A work holder 11, which is adapted to hold the work W under pressure on the mounting surface 7 of the fixed die 6, is disposed slidably between the blades 4, 5, and fastened at its upper portion to the movable die 1 via an elastic member (not shown). The work holder 11 has a work holding surface 12 the cross-sectional shape of which is in conformity with that ot the mounting surface 7 provided at an upper portion of the fixed die 6, and a bore 13 through which a piercing punch 21, which will be described later, is inserted into the piercing bore 10.

Figure 3:
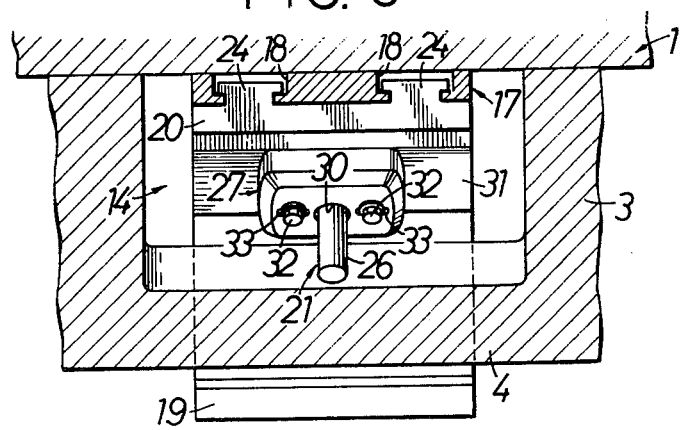
FIG. 3 is a sectional view taken along the line III—III in FIG. 1.

The movable die 1 is provided with a laterally extending through bore 14 in the upper portion of the blade 4. Guide members 17 extending through the bore 14 are fixedly provided on a lower surface of the base portion 3 of the movable die 1 in such a manner that the guide members 17 define a pair of downwardly opened T-shaped grooves 18, 18 as shown in FIG. 3.

A cam slide 19 shown in FIG. 1 has a channel-shaped cross section, and provided with a piercing punch 21 on one end surface of a horizontal member 20 thereof, and an inclined surface 23 on an outer side of a lower portion of a vertical member 22 thereof. As shown in FIG. 3, the cam slide 19 has a pair of T-shaped projections 24, 24 on an upper surface of the vertical member 22. The projections 24, 24 are slidably engaged with the grooves 18, 18 defined by the guide members 17, to allow the piercing punch 21 to be projected through the bore 14 toward the fixed die 6.

The piercing punch 21 has an enlarged base 25 and a blade 26, and is secured to the cam slide 19 in the following manner. The enlarged base 25 is fitted into a larger diameter portion 29 of stepped through bore 28 formed in a mount 27, so as to project the blade 26 out of a smaller diameter portion 30 of the bore 28. The mount 27 is fastened to an inclined surface 31 of the horizontal member 20 with a pair bolts 32, 32. The axis of the resulting piercing punch 21 is parallel to that of the piercing bore 10. In order to render the piercing punch 21 position-adjustable, holes 33, 33 provided in the mount 27 for passage the bolts 32, 32 are elongated.

A bolt 34 is screwed to the other end surface of the horizontal member 20 of the cam slide 19. An outwardly projected portion of the bolt 34 is inserted through a bore 35 provided in the base portion 3, and a return spring 36 and a washer 37 are fitted therearound with a nut 38 screwed to the outer end of the projected portion of the bolt 34. Thus, the cam slide 19 is drawn by the return spring 36 in the direction away from the blade 5. A cam driver 40 having an inclined driving surface 39 parallel to the axis of the piercing bore 10 is fixed with a plurality of bolts 41 to an upper surface of the base 2 so as to face the cam slide 19. When the die 1 is moved downwardly, an inclined driven surface 23 of the cam slide 19, which is parallel to the inclined driving surface 39 of the cam driver 40, comes into sliding contact with the surface 39 to thereby move the cam slide 19 toward the blade 5, so that the piercing punch 21 is fitted into the piercing bore 10.

The operation of the embodiment will now be described.

Figure 2:
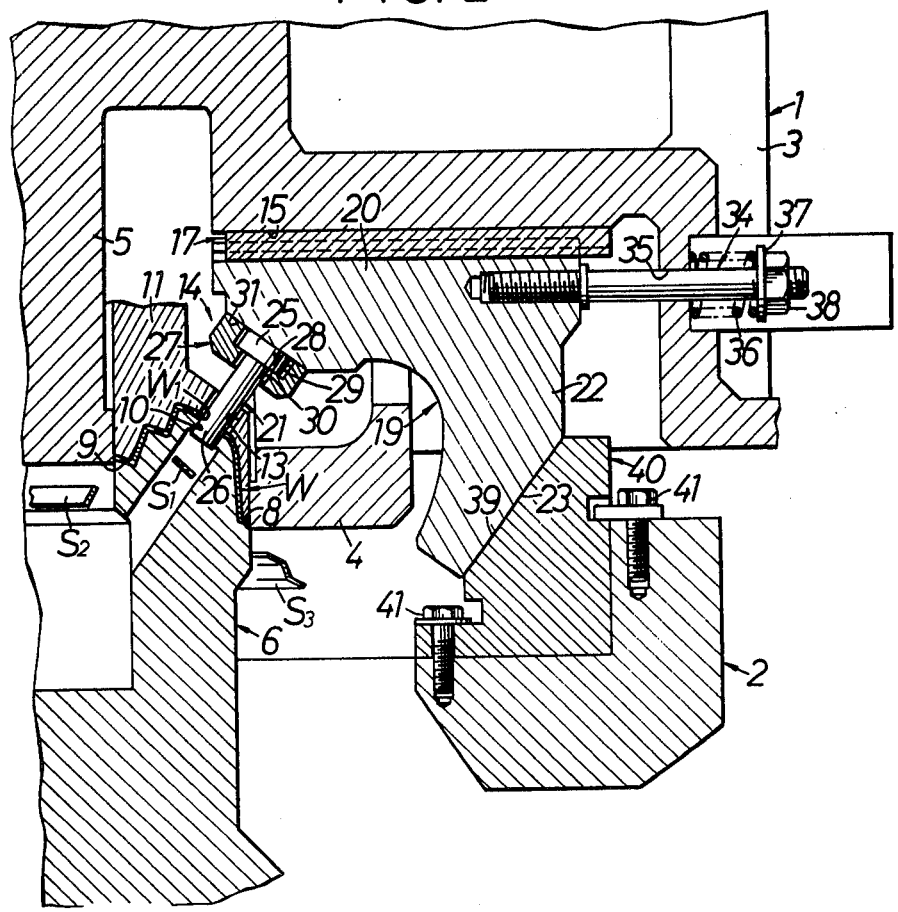
FIG. 2 is a front elevational view in section of the apparatus shown in FIG. 1, in which trimming and piercing operations have just been carried out.

The work W, which has been bent to a form in conformity with the form of the fixed die 6, is placed on the mounting surface 7 at the upper end of the die 6. When the movable die 1 is downwardly displaced, the work holder 11 comes into contact with the work W as shown in FIG. 2, to press the work against the mounting surface 7 of the fixed die 6 and hold the same thereon. When the die 1 is further moved in the downward direction, the inclined driven surface 23 of the cam slide 19 comes into slide contact with the inclined driving surface 39 of the cam driver 40. Consequently, the cam slide 19 advances toward the fixed die 6, or leftward in FIGS. 1 and 2, against the resilient force of the return spring 36. The blade 26 of the piercing punch 21 then advances through the bore 13 in the work holder 11 to reach the work W and pierce the upper portion thereof as the blade 26 and the piercing bore 10 cooperate with each other. As a result, a punched hole $W_1$ is formed. When the die 1 is further moved downwardly, both edge portions of the work W are trimmed by the cooperation of the blades 4, 5 of the die 1 and the blades 8, 9 of the fixed die 6. Reference symbols $S_1$-$S_3$ in FIG. 2 denote chips falling after the piercing and trimming operations have been completed.

When the movable die 1 is then displaced upwardly, the work holder 11 is also moved upwardly, and the cam slide 19 backwardly, or rightward in FIGS. 1 and 2, owing to the resilient force of the return spring 36. As a result, the cam slide 19 is returned to its original position shown in FIG. 1, so that the product is ready to be removed from the die 6.

According to the present invention as described above, piercing and trimming operations can be carried out in one step with a single apparatus. Thus, the cost of equipment is reduced to a great extent. Furthermore, this apparatus also reduces substantially by half the space required for installing conventional apparatuses used for the same purpose. Therefore, the apparatus of the invention does not decrease the working space. With this apparatus, a work need only be positioned once on a die to carry out both piercing and trimming operations, thus simplifying the entire process and greatly improving the productivity as compared with a conventional trimming and piercing apparatus in which a work is transferred and positioned twice for piercing and trimming purposes. Since the apparatus can be formed of a smaller number of component parts, maintenance and inspection thereof are very simple and easy.

The present invention is not, of course, limited to the above embodiment; it may be modified in various ways within the scope of the appended claims.

What is claimed is:

1. A trimming and piercing apparatus comprising a fixed die provided with a work mounting surface and a piercing bore opened in said work mounting surface, a movable die displaceable toward and away from said fixed die, a pair of movable blades and a pair of fixed blades mounted in a spaced opposite relation on said movable die and said fixed die, respectively, so that said movable blades are engageable with said fixed blades when said movable die is moved toward said fixed die, a cam slide slidably mounted on said movable die, a piercing punch fixed to said cam slide, and a cam driver mounted on said fixed die for driving said cam slide to move along said movable die toward said fixed die to place said piercing punch into fitting engagement with said piercing bore in said fixed die as said movable die is displaced toward said fixed die.

2. A trimming and piercing apparatus according to claim 1, wherein the axes of said piercing bore and said piercing punch are parallel to each other.

3. A trimming and piercing apparatus according to claim 2, wherein said cam driver has an inclined driving surface parallel to the axis of said piercing bore, said cam slide having an inclined driven surface opposed to and parallel to said inclined driving surface.

4. A trimming and piercing apparatus according to any one of claims 1, 2, or 3, wherein the axis of said piercing bore is inclined with respect to the direction in which said movable die is displaced.

5. A trimming and piercing apparatus according to any one of claims 1, 2 or 3, comprising means for urging said cam slide to move relative to said movable die in the direction away from said fixed die.

6. A trimming and piercing apparatus according to any one of claims 1, 2 or 3, wherein said movable trimming blades are projected from that end surface of said movable die which is close to said fixed die, said cam slide being provided on said end surface of said movable die for movement relative thereto, said movable blades being provided with a bore for allowing said cam slide to move therethrough.

7. A trimming and piercing apparatus according to any one of claims 1, 2 or 3 wherein said movable die is further provided with a work holder adapted to hold a work under pressure in cooperation with said work mounting surface of said fixed die.

* * * * *